Feb. 24, 1970   J. A. JOHNSTON   3,497,218
BASEBALL PITCHING TRAINING AID
Filed Jan. 22, 1968   2 Sheets-Sheet 1

JOHN A. JOHNSTON
INVENTOR.

BY
ATTORNEY.

Feb. 24, 1970  J. A. JOHNSTON  3,497,218
BASEBALL PITCHING TRAINING AID
Filed Jan. 22, 1968  2 Sheets-Sheet 2

JOHN A. JOHNSTON
INVENTOR.

BY
ATTORNEY.

United States Patent Office 3,497,218
Patented Feb. 24, 1970

3,497,218
BASEBALL PITCHING TRAINING AID
John A. Johnston, 15 Pine Ridge Road,
Arlington, Mass. 02174
Filed Jan. 22, 1968, Ser. No. 699,689
Int. Cl. A63b 69/00
U.S. Cl. 273—26       4 Claims

ABSTRACT OF THE DISCLOSURE

According to the invention, there is disclosed a device for teaching and training the user to hold his hand in a given manner so that when he pitches a ball, rotational characteristics will be imparted thereto causing the ball to deviate from a straight line and thus produce a "curve ball." The invention consists of a band of material encircling the wrist of the user together with a pair of loops adjustably affixed to the band to hold and constrain two of the fingers on the users pitching hand.

BACKGROUND OF THE INVENTION

This invention relates to a training means and, more particularly to a novel device to be used by a pitcher to teach him the proper method of throwing a curve ball.

In the past, for a young baseball pitcher to learn the rudiments of properly throwing a baseball, he must be shown how to hold the ball and how to properly deliver it to the batter. It is well known, that when the ball is released by the pitcher, if a clock-wise rotation (as viewed by the pitcher) were imparted to the ball, the ball will curve to the right. Similarly, a counter clock-wise rotational movement imparted to the ball will cause the ball to curve to the left. In both instances the ball is made to devitate away from an essentially straight line trajectory.

The skills required to throw a ball having varying degrees of either clock-wise or counter clockwise rotation must be fairly well mastered if the pitcher is to achieve any degree of proficiency. However, in order to become an outstanding pitcher, he must acquire at still another pitch for his repertoire. This latter pitch is one of the most difficult to master and involves imparting an over spin to the ball so that (when viewed by the pitcher) after releasing the ball, it has the type of spin wherein the upper surface of the ball is rotating towards the batter while the lower surface of the ball rotates in a direction towards the pitcher. With sufficient rotation of this type imparted to the ball, at the moment of release, the ball will travel in an essentially straight line towards the batter and then suddenly drop at a greater rate of speed than it normally would if no spin has been imparted thereto.

The premise on which the use of my device is based, is to serve as an aid in learning the correct technique in delivering and releasing a baseball to produce a highly effective curve during its travel toward the plate. In addition to teaching the pitcher the proper manner of throwing a curve ball it must be borne in mind that the pitch must be delivered with a minimum of strain on the pitcher's arm.

To properly throw a curve ball, it is necessary that the pitcher realize that it is not the speed or the velocity with which the ball is thrown that determines the amount of the curve but instead, it is the speed of rotation of the ball that determines the amount and the extent to which the ball will curve in flight. Thus, the pitcher must bear in mind, and understand the following two principles: (1) the faster the ball spins or rotates, the greater and sharper the curve, and (2) a ball will tend to curve in the direction in which it is spinning.

Thus, a ball, during its flight toward the batter, which has a forward or over-rotation imparted thereto, will be an effective pitch against both right and left handed batters. It is reasonable to assume that if a batter, in attempting to hit the ball, swings his bat parallel to the ground and the pitched ball breaks downward, it becomes a difficult pitch to time and hit properly. In any event, if it is hit, the tendency would be to hit it on the ground where, hopefully, it will be easily accessible to one of the infielders.

SUMMARY OF THE INVENTION

In my device, an essentially flexible resilient band of material is provided so as to encircle the wrist of the user. A pair of resilient finger holding straps is provided, one end of which is adjustably affixed to the wrist encircling band, the other end of which is formed into non-resident loops that are adapted to be slid over and respectively engage the thumb and fourth fingers of the pitcher's hand. When adjusted, the thumb and fourth fingers are forced downward toward the palm of the hand so that when the ball is gripped it rests on the side of the thumb with the second and third fingers being used to grip the seams of the ball. Thus, when throwing the ball, at the moment the ball is starting to be released, the tension caused by the resilient straps causes the pitcher's wrist to snap down and impart the desired spin or rotational motion to the ball.

It is, therefore, one object of the present invention to provide a training device.

Another object of the present invention is to provide a training device that will teach the user the correct techniques for releasing a baseball so as to deliver a curve ball to the batter.

Still another object of the present invention is to provide a training aid capable of teaching the user how to deliver and release a baseball in such a manner as to cause the ball to curve during its flight without unduly straining his arm.

The features of my invention which I believe to be novel are set forth with particularity in the appended claims. My invention itself, however, both as to its organization and method of operation, together with further objects and advantages thereof, may best be understood by reference to the following description taken in conjunction with the following drawings.

DESCRIPTION OF THE PREFERRED EMBODIMENT

Figure 1:
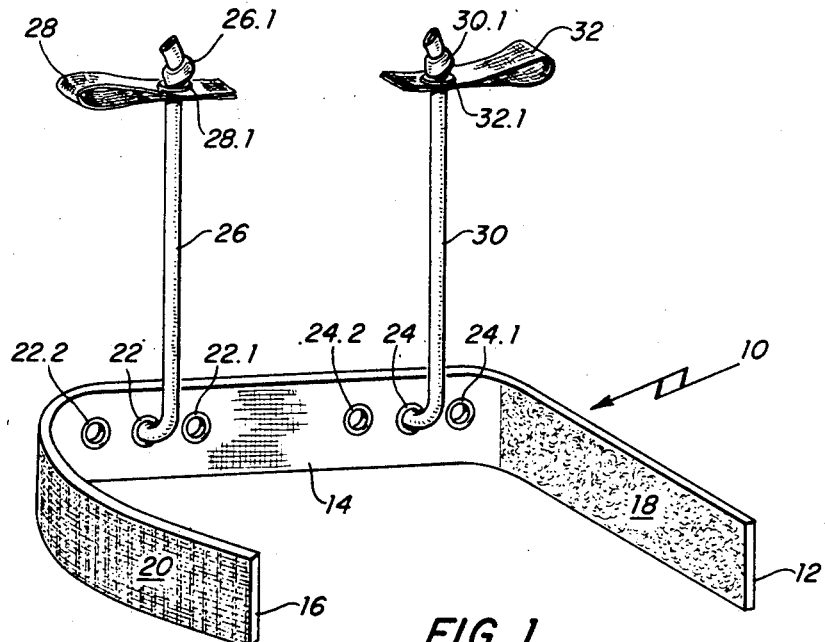
FIGURE 1 is a perspective view of my training device showing the arrangement of parts thereon.

Referring now to FIGURE 1 there is shown my training device 10 consisting of a strip of flexible, soft, leather or fabric and having three contiguous panels portions 12, 14 and 16. The material is essentially in the form of a strip having a pair of flat, broad surfaces for engaging the wrist portion of the user. On one broad surface of panel 12, an area of self binding material such as is known under the trade name "Velcro" is provided. The corresponding material for bind to surface 18 is provided on the opposite broad surface 20 panel 16. Panel 14 is provided with a plurality of adjustment eyelets arranged in groups and, as will be seen, eyelets 22, 22.1 and 22.2 are arranged adjacent panel 16 while eyelets 24, 24.1 and 24.2 are arranged adjacent panel 12.

To complete my device, I provide flexible strips 26 and 30 cooperating respectively with eyelets 22 and 24. One end of strip 26 is provided with a knot (26.2, FIGURE 2) to prevent it from slipping out of eyelet 22. The other end thereof is provided with a loop 28 and having an eyelet 28.1 so that when strip 26 is passed through eyelet 28.1 and provided with a knot 26.1, the loop 28 becomes adjustably, resiliently affixed to panel 14 of my training device 10. Similarly, flexible strip 30 is passed through eyelet 24 and the end thereof is provided with a knot (30.2, FIGURE 2) to prevent strip 30 from slipping through eyelet 24. The other end of strip 30 is passed through eyelet 32.1 of loop 32 and is provided with a knot 30.1 so that loop 32 is also effectively adjustably, resiliently affixed to panel 14 of my training device 10.

Figure 2:
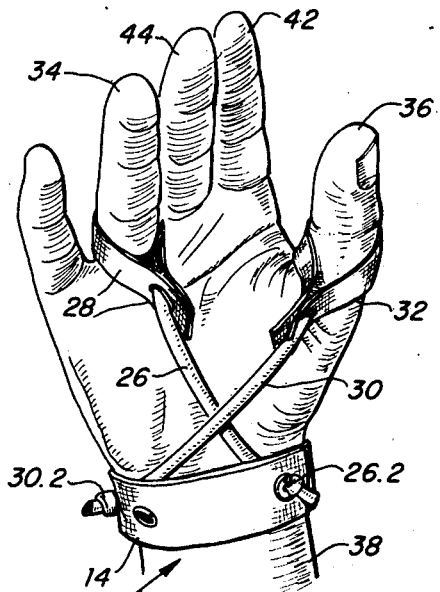
FIGURE 2 is a view of my training device applied to the hand of a pitcher.

Referring now to FIGURE 2 there is shown the device being used on the hand of a pitcher. In this figure, training device 10 has been placed about wrist 38 of the user with panel portion 14 being immediately adjacent and below the palm. To provide the pitcher with a proper grip, strip 26 is elongated to the point where loop 28 will slide over and engage the fourth finger (34) of the user. Similarly, strip 30 is stretched and elongated so that loop 32 is made to slide over and engage thumb (36). Both loops 28 and 32 are arranged to respectively engage digits 34 and 36 at the bases thereof. In FIGURE 2, strips 26 and 30 have essentially no tension thereon as indicated by the fact that digits 34 and 36 are not being forced down into the pitcher's palm. Therefore, to apply tension to these digits, it is merely necessary to pull knot 26.2 so as to apply tension strip 26 and then, to apply tension to strip 30 by pulling knot 30.2. This then causes digit 34 to fold down and in towards the palm and digit 36 is made to rest on top of digit 34, leaving the second and third fingers free to grip the ball during delivery.

Figure 3:
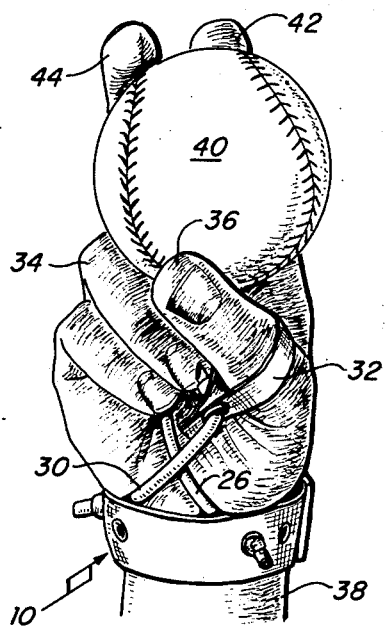
FIGURE 3 is a view of my training device applied to the hand of a pitcher while learning the proper grip to throw a curve ball.

Referring now to FIGURE 3 there is shown my device being worn by a pitcher and gripping a ball immediately prior to delivery thereof. In this situation, it should be noted that ball 40 is being gripped on the parallel portions of the seams by fingers 42 and 44 with the ball resting in the V formed by the now bent thumb 36 and fourth finger 34.

Figure 4:
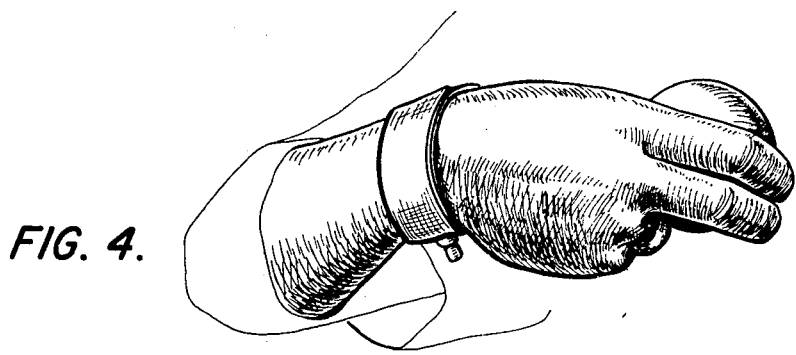
FIGURE 4 is a view of my training device applied to the hand of a pitcher immediately before the ball is released to deliver a curve.
Figure 5:
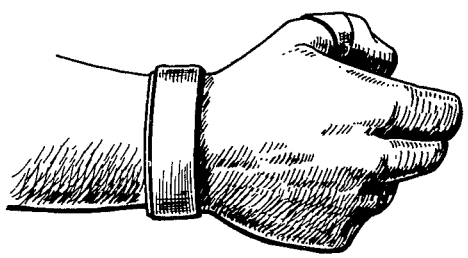
FIGURE 5 is a view of my training device applied to the hand of a pitcher immediately after throwing a curve having overspin.

Referring now to FIGURE 4 there is shown the position of the pitcher's arm and hand immediately prior to releasing the ball while FIGURE 5 shows the position of his fingers immediately after having released the ball and imparted an over spin thereto.

Figure 6:
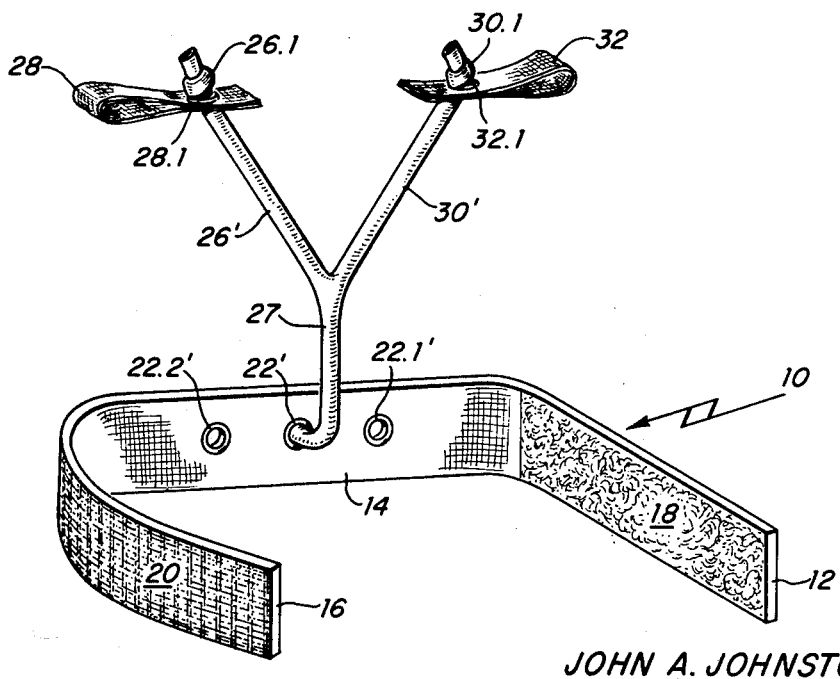
FIGURE 6 is a perspective view of another embodiment of my training device showing the arrangement of parts thereon.

Referring now to FIGURE 6, there is shown another embodiment of my novel training device wherein like elements are similarly numbered to corresponding elements in FIGURE 1. In this latter embodiment it will be noted that there is a single flexible strip, Y shaped, consisting of a lower portion 27 and a pair of upper portions 26' and 30'. Portion 26' has at its free end loop 28 having an eyelet 28.1 so that when strip 26' is passed through eyelet 28.1 and is provided with a knot 26.1, loop 28 becomes adjustably, resiliently affixed to panel 14 of my training device 10. Similarly, upper portion 30' is passed through eyelet 32.1 of loop 32 and is provided with a knot 30.1 so that loop 32 is also effectively adjustably, resiliently affixed to panel 14 of my training device 10. Lower portion 27 has one end affixed to the junction of portions 26' and 30' and its other end inserted through adjustment eyelets 22', 22.1' and 22.2' arranged in panel 14. In this embodiment it is now merely necessary to pull strip 27 through eyelet 22.2' to apply the required tension which will cause the fourth finger to be pulled down and in towards the palm of the pitcher while the thumb is caused to be pulled down and made to rest on top of the thumb, leaving the second and third fingers free to grip the ball during delivery.

While I have described what is presently considered the preferred embodiments of my invention, it will be obvious to those skilled in the art that various other changes and modifications may be made therein without departing from the inventive concept, and it is aimed in the appended claims to cover all such changes and modifications as fall within the true spirit and scope of my invention.

What I claim is:

1. A baseball pitching training aid, comprising:
   a strip of flexible material having a pair of end panels;
   a center panel, contiguous with and connecting each end panel;
   binding means on each of the end panels for releasably joining the end panels to each other about the wrist of a user;
   flexible, resilient, adjustment means, one end of which is adjustably connected to the center panel, the other end of which encircles selected first phalanxes of digits on the users hand;
   a plurality of eyelets located on the center panel through which the one end of the adjustment means is adjustably affixed, the one end of the adjustment means extending through a selected eyelet and being provided with an end enlargement of greater dimension than the opening in the eyelet; and
   a loop of flexible material at the other end of the adjustment means.

2. A device of claim 1 wherein:
   the flexible, resilient, adjustment means is a pair of strips, one end of each of the strips extends through selected eyelets in the center panel.

3. The device of claim 2 wherein:
   the loops at the other end of the adjustment means encircles the thumb and fourth digits of the users hand, at the first phalanxes thereof.

4. The device of claim 1 wherein:
   the flexible, resilient, adjustment means is Y-shaped;
   the lower portion thereof adjustably, resiliently affixed to the center panel; and
   a plurality of loops connected to the upper portion of the Y, at the free ends thereof, to encircle the thumb and fourth digits of the users hand at the first phalanxes thereof.

References Cited

UNITED STATES PATENTS

| | | | |
|---|---|---|---|
| 1,126,938 | 2/1915 | Barrett | 273—54 |
| 3,369,254 | 2/1968 | Smith | 273—54 X |

RICHARD C. PINKHAM, Primary Examiner

T. BROWN, Assistant Examiner